United States Patent [19]

Klopfenstein

[11] Patent Number: 4,561,668

[45] Date of Patent: Dec. 31, 1985

[54] OPERATOR POWERED RECIPROCATING DRIVE SYSTEM

[76] Inventor: King L. Klopfenstein, 10 Drake Ter., Prospect Heights, Ill. 60070

[21] Appl. No.: 597,082

[22] Filed: Apr. 5, 1984

[51] Int. Cl.[4] .................. B62M 1/20; B62M 1/04
[52] U.S. Cl. .............. 280/226 R; 280/230; 280/257
[58] Field of Search ............ 280/230, 257, 226 R, 280/253, 258, 227, 255, 252

[56] References Cited

U.S. PATENT DOCUMENTS

| | | | |
|---|---|---|---|
| 514,198 | 2/1894 | Moen et al. | 280/257 X |
| 1,457,731 | 6/1923 | Dupuis | 280/226 R |
| 1,648,609 | 11/1927 | Di Marzo | 280/257 X |
| 2,383,000 | 8/1945 | McLean | 280/258 |
| 2,770,463 | 11/1956 | Battaglia et al. | 280/227 X |
| 3,375,023 | 3/1968 | Cox | 280/255 X |
| 3,659,871 | 5/1972 | Hott | 280/258 X |
| 3,661,404 | 5/1972 | Bossaer | 280/255 |
| 3,759,543 | 9/1973 | Clark | 280/255 |
| 3,779,099 | 12/1973 | Trammell | 280/257 X |
| 4,019,230 | 4/1977 | Pollard | 280/255 X |
| 4,063,747 | 12/1977 | Young | 280/255 |
| 4,169,609 | 10/1979 | Zampedro | 280/252 X |
| 4,178,807 | 12/1979 | Young | 280/255 X |
| 4,227,712 | 10/1980 | Dick | 280/255 X |
| 4,272,096 | 6/1981 | Efros | 280/255 |
| 4,371,185 | 2/1983 | Bals | 280/227 |
| 4,379,566 | 4/1983 | Titcomb | 280/253 X |

FOREIGN PATENT DOCUMENTS

| | | | |
|---|---|---|---|
| 808192 | 5/1951 | Fed. Rep. of Germany | 280/257 |
| 373674 | 5/1907 | France | 280/230 |
| 424250 | 5/1911 | France | 280/230 |
| 332882 | 12/1935 | Italy | 280/253 |

*Primary Examiner*—John A. Pekar
*Attorney, Agent, or Firm*—Emrich & Dithmar

[57] ABSTRACT

An operator-responsive drive system is capable of rotating a drive wheel in either a velocipede, such as a bicycle, or a stationary exerciser. In a first mode of operation, drive linkage connects a pair of coupled pedals and a seat pivotally coupled to a frame to a drive sprocket which is rotationally mounted to the frame. Downward displacement of the seat such as in response to the weight of the operator positioned thereupon causes both pedals to be displaced upward in imparting rotation to the drive sprocket which, in turn, rotates a drive wheel coupled thereto. Transfer of the operator's weight to the pedals resulting in the downward displacement of the pedals causes further rotation of the sprocket in the same direction and upward displacement of the seat. The operator may thus propel the vehicle by alternately shifting his weight between the seat and the pedals in effecting reciprocating displacement thereof. In a second mode of operation, the seat is fixedly mounted to the frame and linkage connecting each of the decoupled pedals to the drive sprocket permits the pedals to be alternately displaced downward in a reciprocating, generally linear manner in rotationally displacing the drive sprocket in one direction. The drive system is easily converted from one mode of operation to the other and provides a highly efficient arrangement for converting operator movement to drive wheel rotation.

19 Claims, 13 Drawing Figures

OPERATOR POWERED RECIPROCATING DRIVE SYSTEM

BACKGROUND OF THE INVENTION

This invention relates generally to operator-energized drive systems and is particularly directed to a drive system for converting operator-initiated forces to the rotational displacement of a drive wheel.

Operator-energized wheel drive mechanisms generally comprise a large rotatable sprocket and a pair of pedals secured thereto with a flexible, endless chain connecting the pedal carrying sprocket to a drive sprocket mounted to a drive wheel such as in a velocipede. Such arrangements are typically found in a conventional bicycle and in stationary exercise apparatus. Rotational displacement of the pedals by the operator causes the operator's feet engaging the pedals to follow a circular path with the pedals oppositely disposed such that at one point during each revolution the pedals are positioned vertically relative to one another. The pedals must then be moved from this vertical "dead center" position to permit force imparted to the pedals to be delivered as rotary motion to the drive wheel of the apparatus.

This rotating crank arrangement is inefficient since maximum leverage is applied by the operator only during a portion of each stroke, with the leverage at the top and the bottom of the circle of rotation being very small. Thus, over a large portion of the drive pedal displacement range a minimal drive force is applied by the operator even though energy must be expended for continued rotational displacement of the drive sprocket in order to position it in an orientation where an increased drive force may be applied thereto.

In an attempt to improve the efficiency of such a pedal operated drive mechanism, various reciprocating pedal arrangements have been proposed. This approach has generally included paths of displacement of the pedals which more closely approximate straight line movement adapted for the application of the strongest and most extended leg thrust of the operator. Thus, the pedals are reciprocally displaced along generally vertical axes by means of an essentially tangential force applied by the operator. In the past such reciprocating pedal drive mechanisms designed to provide a nearly constant leverage have been overly complex and expensive and frequently have required gears in order to reduce the energy required for operation over extended periods of time. Because of these shortcomings, reciprocating pedal drive systems have not enjoyed general acceptance and widespread usage.

The present invention is intended to overcome the aforementioned limitations of the prior art by providing an operator powered reciprocating drive system capable of operating in either of two modes. In a first mode, the pedals are displaced in an alternating, reciprocating manner along a generally vertical axis. In a second mode of operation the pedals are displaced together along a generally vertical axis in a reciprocating manner in combination with the alternate, reciprocal, vertical displacement of a seat upon which the operator is positioned. The present invention thus makes more efficient use of the operator's strength and weight in imparting rotation to a drive wheel.

OBJECTS AND SUMMARY OF THE INVENTION

Accordingly, it is an object of the present invention to provide an improved reciprocating pedal drive arrangement for use in a velocipede or a stationary exerciser apparatus.

It is another object of the present invention to provide a drive mechanism for a rotatable wheel which makes more efficient use of the operator's weight by converting it to a rotational drive force during the entire 360° rotation of the wheel.

Still another object of the present invention is to provide a reciprocating pedal drive arrangement which can be incorporated in a conventional bicycle with a few minor modifications thereto.

A further object of the present invention is to provide a reciprocating pedal drive mechanism for a velocipede which is easily convertible between two modes of operation.

A still further object of the present invention is to convert generally vertical reciprocating pedal and seat displacement to drive wheel rotation in a velocipede.

These and other objects are accomplished in the present invention which contemplates a drive arrangement for a stationary exerciser or a velocipede, such as a bicycle or the like, which includes two user operated pedals pivotally coupled by means of suitable linkage to a driving front sprocket which, in turn, is coupled by means of a flexible, endless chain to a rear driven sprocket for rotation of a drive wheel coupled thereto.

In a first mode of operation, a seat is mounted to a frame by means of a pivot arm. Two rigidly coupled pedals are also connected to respective frame mounted pivot arms which, in turn, are coupled by means of first linkage to a forward drive sprocket. Downward displacement of the pedals imparts rotation to the forward drive sprocket in a first direction through a first overrunning clutch arrangement which is comprised of a bearing and clutch combination for applying a torque to the drive sprocket in sustaining rotation of the drive sprocket. Second linkage couples the rotating drive sprocket to the pivot arm upon which the seat is mounted for displacing the seat generally vertically upward. The seat and pedals are pivotally coupled to the forward drive sprocket in a complementary manner such that downward displacement of the pedals causes an upward displacement of the seat and downward displacement of the seat causes an upward displacement of the pedals. The second linkage permits the downward displacement of the seat to rotate the drive sprocket in the same direction of rotation as that due to pedal displacement by means of a second overrunning clutch arrangement which is also comprised of a bearing and clutch combination for applying a torque to the drive sprocket in sustaining rotation of the drive sprocket. In this arrangement, the two pedals and the seat are alternately displaced in a reciprocating manner in a generally vertical direction to impart a "galloping horse" effect to the operator. Suitable cushion stops mounted to the frame limit the downward displacement of both the pedals and the seat.

In a second mode of operation, which involves a minor modification of the drive linkage as utilized in the aforementioned first mode, the seat is fixedly secured to the frame and modified linkage allows for the alternating reciprocal displacement of the right and left pedals such that a downward force on the right pedal imparts rotation to the drive sprocket through a first roller clutch assembly and simultaneously lifts the left pedal. Conversely, a downward force applied to the left pedal imparts same direction rotation to the drive sprocket through a second roller clutch assembly and simultaneously lifts the right pedal. In this arrangement, more efficient use is made of the leg strokes of the operator over that available in a conventional rotary type pedal drive system where a maximum torque is applied to the drive sprocket only when the pedal cranks are oriented generally horizontally. In both embodiments, it is not required that the pedals, and in the case of the first embodiment discussed above, the seat, to travel their complete stroke as is required in conventional rotary drive mechanisms.

By employing a shorter midstroke and realizing the increased leverage available therefrom, more power is available in both embodiments of the present invention to facilitate upslope travel without requiring the shifting of sprocket ratios as is common in conventional rotary drive systems.

Further variations of the two embodiments of the present invention described above comprise a simplified drive arrangement which includes two opposed crank arms coupled at respective first ends thereof to the front drive sprocket and at respective second ends thereof to a respective pivot arm upon which one of the pedals is mounted. This arrangement eliminates the need for an overrunning clutch assembly, but does not provide a coasting capability for the drive wheel. The momentum of the drive wheel is required to carry the linkage through its upper "on center" position where the connecting link is in line with the crank arm and the driving force is unable to impart rotation to the drive sprocket.

BRIEF DESCRIPTION OF THE DRAWINGS

The appended claims set forth those novel features believed characteristic of the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DESCRIPTION OF THE PREFERRED EMBODIMENTS

Referring to FIGS. 1 through 4, there is shown a first embodiment of an operator powered reciprocal drive system in accordance with the present invention. While the reciprocal drive system is shown for use in a conventional bicycle, it is not thus limited in its application and may be easily utilized with any pedal operated vehicle or stationary exercise apparatus having a seat upon which an operator is positioned.

The reciprocal drive system includes a seat 1 adjustably attached to a seat arm 2 which is pivotally coupled to a vehicle frame 3 by means of pivot bearings 4. One end of a link 5 is coupled to the seat arm 2 by means of a pivot bearing 6 while the other end of link 5 is coupled to a drive lever 7 by means of a pivot bearing 8. An overrunning clutch 9 is housed in the hub of a drive arm 7 and is mounted on the end of a sprocket drive shaft 10 which is housed for rotation by conventional means within the hub 34 of frame 3. A sprocket drive shaft 10 is coupled to a drive sprocket 11 which transmits torque to a rear, driven sprocket 12 by means of a flexible, endless chain 14. The rear, driven sprocket 12 is attached to a rear wheel 13 for imparting rotation thereto and propelling the frame 3. Frame 3 further includes a fork assembly 47 pivotally coupled to a front portion of the frame 3 to which a front wheel 46 is rotationally mounted. Securely affixed to an upper portion of the fork 47 are handlebars 48 for facilitating the steering of the frame 3.

One end of a link 15 is coupled to the seat arm 2 by means of a pivot bearing 16 which is in line with the aforementioned pivot bearing 6. A second end of link 15 is coupled to a drive lever 33 by means of a pivot bearing 17. An overrunning clutch 18 is housed in the hub of the drive lever 33 and is mounted on the end of the sprocket drive shaft 10 on an end opposite to that upon which the overrunning clutch 9 is mounted. On the end of drive lever 33 generally opposite the end upon which pivot bearing 17 is mounted is a pivot bearing 19 which pivotally couples one end of link 20 to the drive lever 33. The opposite end of link 20 is coupled to a left pedal arm 21 by means of a pivot bearing 22. One end of the left pedal arm 21 is coupled to a left pedal 23 by conventional means. The other end of the left pedal arm 21 is coupled to the frame 3 by means of suitable pivot bearings 24. A tie member 25 couples the left pedal arm 21 to a right pedal arm 26. One end of the right pedal arm 26 is coupled to a right pedal 27 by conventional means. The other end of the right pedal arm 26 is coupled to the frame 3 by means of suitable pivot bearings 28 which are in line with the aformentioned pivot bearings 24. A stop 29 mounted to the frame 3 limits the downward displacement of the seat arm 2. Similarly, a stop 30 limits the downward displacement of the left pedal arm 21 and a stop 31 limits the downward displacement of the right pedal arm 26. The pedal limiting stops 30, 31 are both securely mounted to a lower portion of the frame 3 and are preferably comprised of a resilient cushion material such as rubber in order to provide limited displacement of the pedals and associated linkage in allowing for the deceleration thereof prior to stoppage and reducing the impact shock associated therewith.

Figure 1:
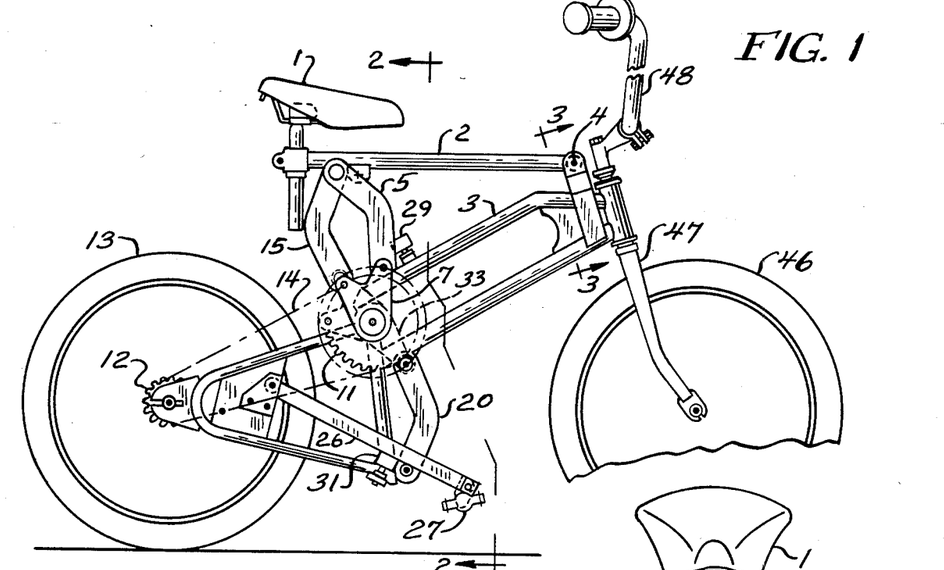
FIG. 1 is a side elevational view of a bicycle incorporating a reciprocating drive system in accordance with one embodiment of the present invention.
Figure 2:
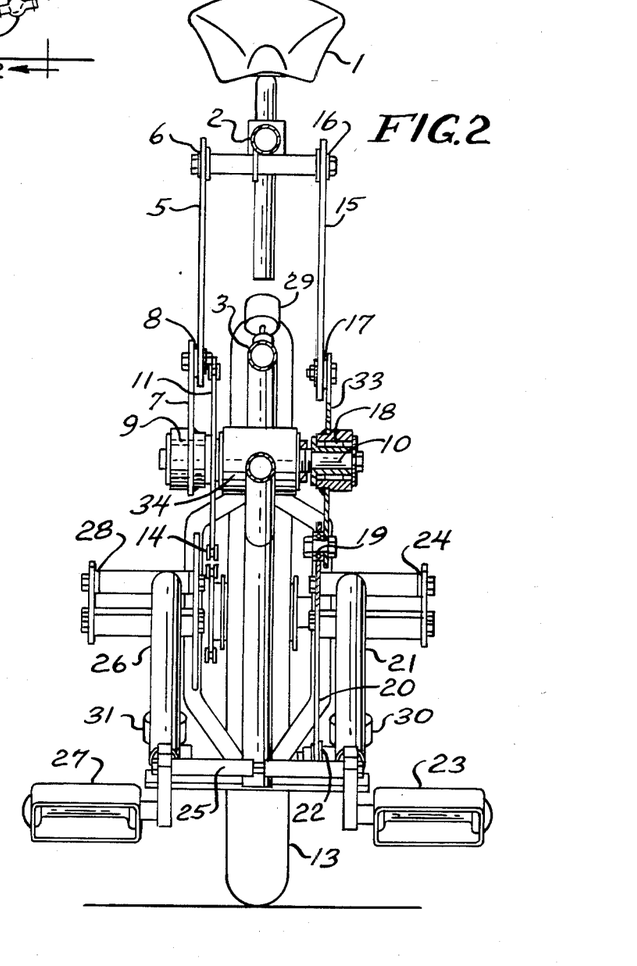
FIG. 2 is a front sectional view of the bicycle of FIG. 1 taken along sight line 2—2 therein.
Figure 3:
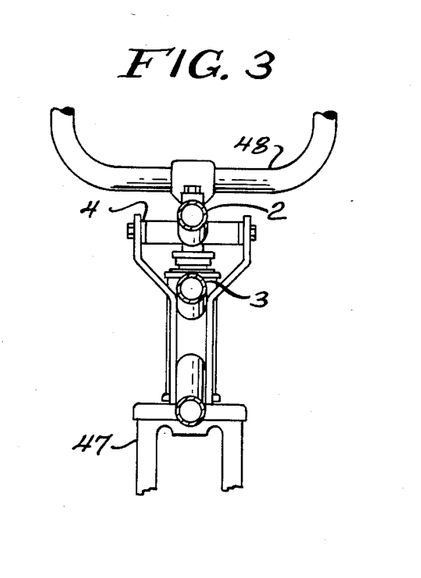
FIG. 3 is a partial sectional view of a portion of the reciprocating drive system of the present invention adapted for use in a bicycle taken along sight line 3—3 in FIG. 1.
Figure 4:
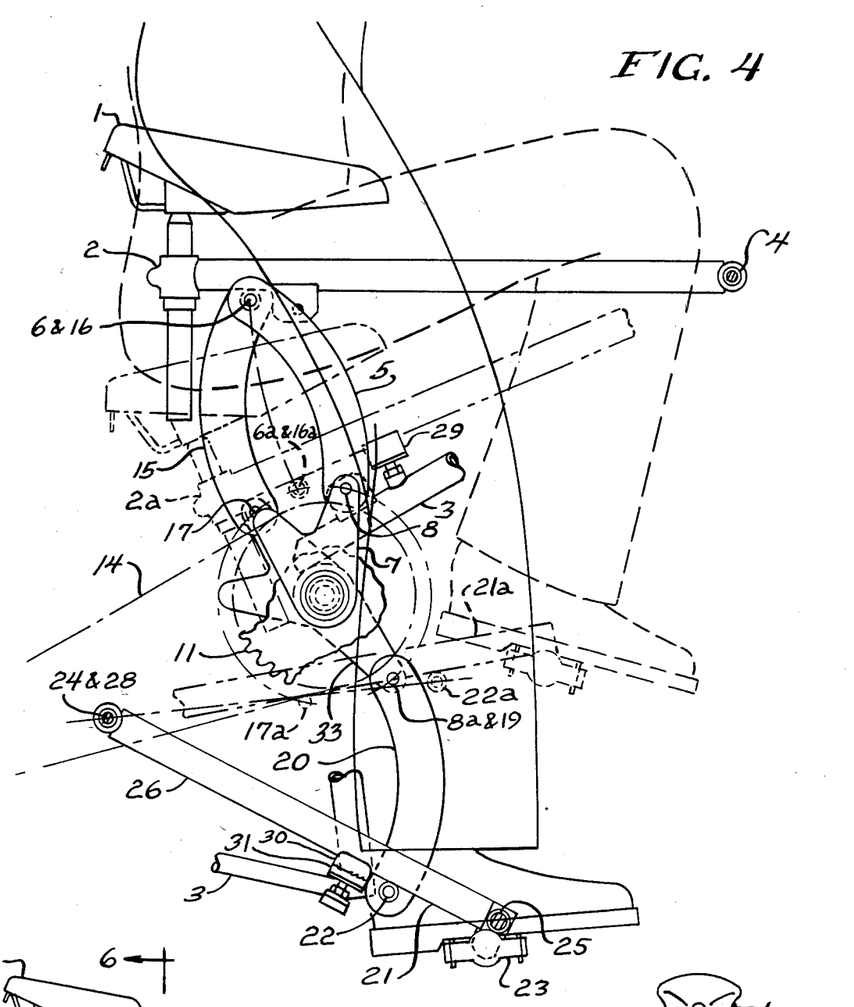
FIG. 4 is a partially cutaway side elevational view of the reciprocating drive system for use in a bicycle shown in FIG. 1 illustrating two different positions for the pedals and seat thereof during operation by a person positioned thereon.

Referring specifically to FIG. 4, there is shown a partial side elevational view of an operator powered reciprocating drive system adapted for use in a bicycle illustrating two operating positions of various components thereof. In FIG. 4, the seat arm 2 is shown in solid lines in its uppermost position prior to displacement downward by virtue of the operator's weight positioned upon the seat 1. With the weight of the operator positioned upon the seat 1, the pivoting seat arm 2 is displaced downward to its lowest position, shown as element 2a in dotted line form in FIG. 4, where it abuts the stop 29 mounted to the frame 3. With the seat arm 2 displaced to the full down position, the upper pivot bearing 6 for the link 5 is similarly displaced downward and is shown in dotted line form as element 6a in FIG. 4. At the same time, the upper pivot bearing 16, positioned behind and in line with pivot bearing 6 as shown in FIG. 4, also is displaced downward as shown in dotted line form as element 16a. The pivot bearings 6a and 16a thus are positioned in alignment with the seat 1 in the full down position. The pivot bearing 8 of link 5 rotates drive arm 7 clockwise to a position indicated by numeral 8a, wherein the pivot bearing 8 is in general alignment with the pivot bearing 19. The clockwise rotation of the drive arm 7 rotates the sprocket drive shaft 10 through the overrunning clutch 9, as best shown in FIG. 2. Simultaneously, the bearing pivot 17 of link 15 rotates the drive arm 33 counterclockwise to a position shown by numeral 17a. The opposite end of drive arm 33 is attached to link 20 by means of the pivot bearing 19 such that rotation of the drive arm 33 lifts link 20 which, in turn, raises the pedal arm 21 due to the rigid coupling between pedal arms 21 and 26 via the tie member 25. The pedal arms 21 and 26, shown in solid line form with pedal arm 26 and stop 31 fragmented to better show pedal arm 21 and tie member 25 in their lowest position in FIG. 4, are lifted to their uppermost position shown in dotted line form as numeral 21a. Upward displacement of the pedal arms 21 and 26 also lifts the operator's feet as shown in dotted line form in FIG. 4, with pivot bearing 22 raised to position 22a as shown therein. The overrunning clutch 18 permits the counterclockwise rotated drive arm 33 to slip over the clockwise rotated sprocket drive shaft 10.

After the pedals 23, 27 have been displaced to their uppermost position as shown in dotted line form in FIG. 4, the operator then shifts his weight from the seat 1 back to the pedals 23, 27 causing them to be displaced downward and a reversal of the rotation of the aforementioned linkage. Downward displacement of the pedals 23, 27 and respeotive pedal arms 21, 26 coupled thereto causes the drive arm 33 to rotate clockwise which, in turn, rotates the sprocket drive shaft 10 through the overrunning clutch 18. The clockwise rotation of the drive arm 33 further results in the counterclockwise rotation of drive arm 7 which slips over the clockwise rotation of the sprocket drive shaft 10 by means of the overrunning clutch 9. The operator's legs are shown in solid line form in the full down position and in dotted line form in the full up position in FIG. 4. The generally vertical reciprocating displacement of the pedals 23 and 27 in an alternating manner with the seat 10 results in the rotation of the forward drive sprocket 11 in one direction for propelling the vehicle. Thus, the operator merely has to shift is or her weight from the seat 1 to the pedals 23, 27 in an alternating manner in order to propel the vehicle.

Figure 5:
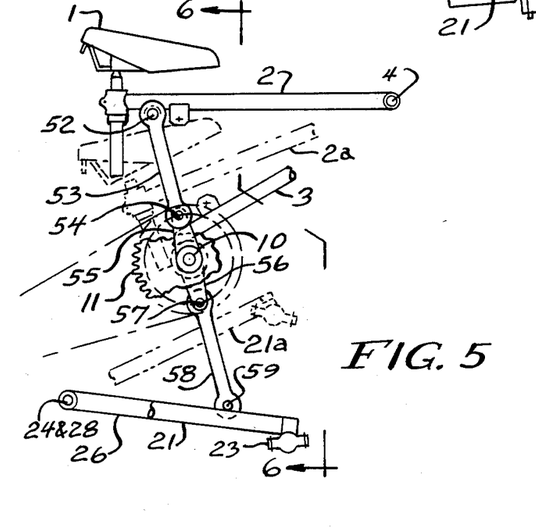
FIG. 5 is a partially cutaway side elevational view of another arrangement of the operator powered reciprocating drive system adapted for use in a bicycle as shown in FIGS. 1 and 4.
Figure 6:
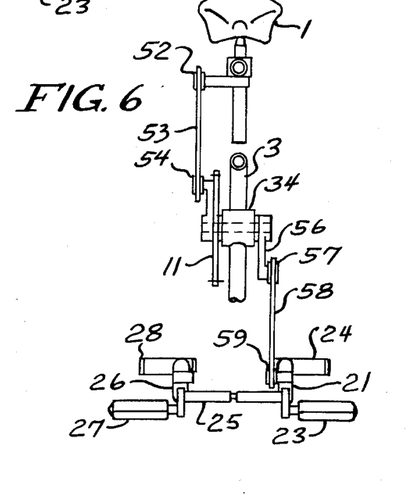
FIG. 6 is a front sectional view of the reciprocating drive system of FIG. 5 taken along sight line 6—6 therein.

Referring to FIGS. 5 and 6 there is shown another embodiment of an operator powered reciprocating vehicle drive system wherein the seat and pedals are reciprocally displaced in an alternating manner in propelling the vehicle. The difference between the embodiment shown in FIGS. 5 and 6 and that previously described involves the linkage coupled between the forward drive sprocket 11 and the seat and pedal arms. A pivot bearing 52 is positioned on a first end of link 53 and is pivotally attached to the seat arm 2 which swings about a pivot bearing 4 attached to the frame 3. A pivot bearing 54 is positioned on a second end of link 53 and is attached to the end of a crank arm 55 which, in turn, is securely attached to one end of the sprocket drive shaft 10. A second crank arm 56 is attached to the other end of the sprocket drive shaft 10, with the other end of the crank arm 56 attached to the upper pivot bearing 57 of link 58. The pivot bearing 59 on the lower end of link 58 is attached to the pedal arm 21 which, in turn, is attached to pedal arm 26 by means of a tie member 25.

As shown in FIGS. 5 and 6, the crank arm 55 is in the "on center" position with respect to link 53. In order to propel the vehicle forward, the vehicle must be moved slightly forward to effect the rotation of the drive sprocket 10 which, in turn, rotates the crank arm 55 beyond the "on center" position to permit the weight of the operator upon the seat 2 to rotate the crank arm 55. Rotation of the crank arm 55 will cause rotation of the sprocket 11 through the sprocket drive shaft 10 in propelling the vehicle forward. Rotation of the crank arm 56 raises link 58 which, in turn, lifts the pedal arm 21 and by means of tie member 25 also lifts pedal arm 26. In this manner, both pedal arms are displaced to their uppermost position as shown in dotted line form as element 21a in FIG. 5. Simultaneously, the seat arm 2 is pivotally displaced to its lowest position shown in dotted line form as element 2a. The momentum of the drive wheel (not shown in FIG. 5) carries the two crank arms 55, 56 through their "on center" position, alternately transferring the weight of the operator from the seat 1 to the pedals 23, 27. When either the seat 1 or the pedals 23, 27 are moving downward, the opposed crank arms 55, 56 rotate which, in turn, causes rotation of the forward drive sprocket 11 for propelling the vehicle.

In the embodiment shown in FIGS. 5 and 6, the two opposed crank arms 55, 56 and the two links 53, 58 replace the two drive arms, the two overrunning clutches, the three links, and the related stops previously described with respect to FIGS. 1 through 4. However, the simpler linkage shown in FIGS. 5 and 6 does not permit the vehicle to coast. Coasting is not compatible with the drive linkage of FIGS. 5 and 6 because the forward momentum of the drive wheel is required to carry the two opposed crank arms beyond the position that is in line with an associated link. When a crank is in line with its respective link in the "on center" position, the pulling force on the link imparted by pressure exerted either on the pedals or the seat cannot impart rotation to the drive sprocket and thus is unable to propel the vehicle.

In the arrangement shown in FIGS. 1 through 4, the vehicle is propelled forward by alternately shifting the operator's body weight from the seat to the pedals. This gives the operator a "galloping horse" effect. Downward displacement of either the seat or the pedals will cause rotation of the rear drive wheel 13. The use of two overrunning clutches in the drive mechanism permits coasting and thus eliminates the need for a conventional rear wheel hub incorporating the bearing clutch combination found in a typical coaster brake. The motion of the seat and pedals may be reversed at any elevation, or during any portion of the downward stroke of either, with maximum power being generated in the mid-portion of each downward stroke.

Figures 11, 12, 13:
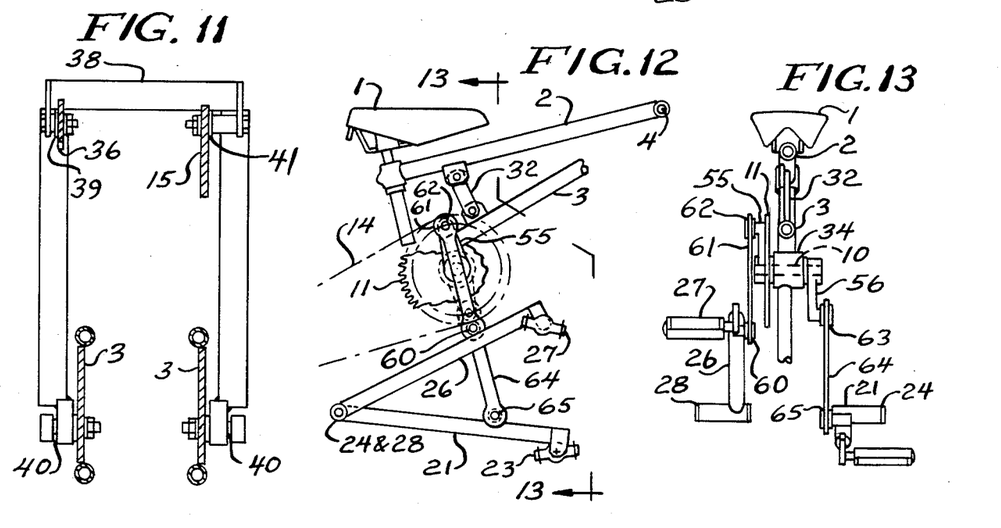
FIG. 11 is a vertical sectional view of a portion of the reciprocating drive system of FIG. 10 taken along sight line 11—11 therein.
FIG. 12 is a partial side elevational view of another embodiment of the reciprocating drive system of FIG. 10.
FIG. 13 is a vertical sectional view of the reciprocating drive system of FIG. 12 taken along sight line 13—13 therein.

Referring to FIGS. 7, 8, 10 and 11, there is shown another embodiment of the present invention in which a seat 1 is fixedly coupled to a frame 3 by means of a stationary seat arm 2. The seat 1 is adjustably attached to the seat arm 2 which is, in turn, coupled to the frame 3 by means of a pivot bearing 4 and a tie bar 32. The upper end of a link 5 is coupled to a drive arm 7 by means of a pivot bearing 8, with the lower end of the link 5 coupled to a pedal arm 26 by means of a pivot bearing 35. The pedal 27 is attached to one end of a pedal arm 26. Also mounted on drive arm 7 by means of a pivot bearing 37 is one end of a link 36. The other end of link 36 is attached to a control arm 38 by means of a pivot bearing 39. The control arm 38 is coupled to the frame 3 by means of a pair of suitable in-line pivot bearings 40 positioned on either side of the rear wheel 13 and housed in the lower end of the parallel vertical members which comprise the control arm 38 as shown in FIG. 11. The respective upper ends of the parallel vertical members are coupled to a tubular cross member to form a rigid yoke over the rear wheel 13. A first pivot bearing 41 is positioned in line with a second pivot bearing 39 and on an opposite end of the control arm 38 and serves as a coupling for link 15 at a first end thereof.

A second end of link 15 is connected to the drive arm 33 by means of a pivot bearing 43. Generally opposite the coupling of link 15 with drive arm 33 is a connection with link 20 by means of a pivot bearing 19. The opposite end of link 20 is coupled to the pedal arm 21 by means of a pivot bearing 22. Control arm 38 in cooperation with links 15 and 20 causes the drive arms 7 and 33 to oscillate in opposite directions. Pedal 23 is attached to the end of pedal arm 21. A stop 30 limits the downward displacement of the pedal arm 21, while stop 31 limits the downward displacement of pedal arm 26. Two overrunning clutches 9 and 18 are mounted on respective ends of drive shaft 10 and function in a manner similar to that described previously with respect to the first embodiment of the present invention in applying torque to the drive shaft 10 in the same direction for rotation of the drive sprocket 11 which, in turn, rotates the rear wheel 13 by means of the combination of a rear sprocket 12 and flexible, endless chain 14. A front wheel 46 is attached to a fork 47 which is pivotally coupled to a forward portion of the frame 3 and to which is attached a handlebar 48 in a conventional manner.

Figure 7:
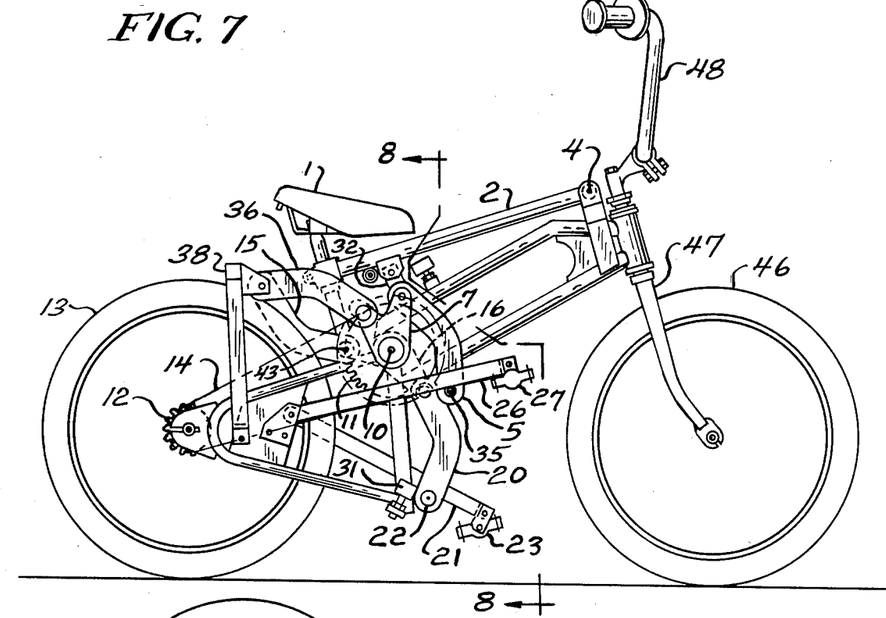
FIG. 7 is a side elevational view of an operator powered reciprocating drive system for use in a bicycle in accordance with a second embodiment of the present invention.
Figure 8:
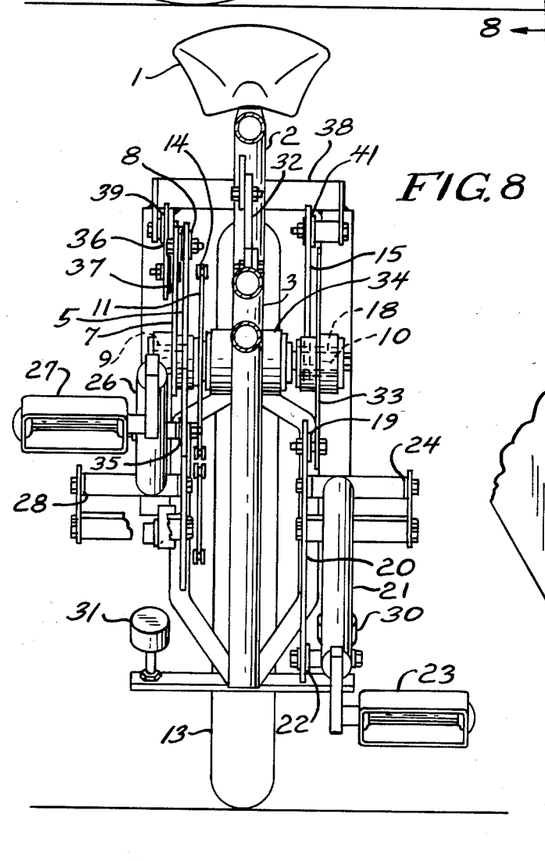
FIG. 8 is a front sectional view of the reciprocoating drive system of FIG. 7 taken along sight line 8—8 therein.

The seat arm 2 is rigidly coupled to the main frame 3 by means of a pivot bearing 4 and a tie bar 32 at respective ends thereof. The pedal arm 26, shown in its uppermost position in FIGS. 7 and 8, is displaced downward to its lowest position against stop 31 when the rider's weight is applied to pedal 27. A lower pivot bearing 35 is then displaced downward so as to be positioned in alignment with where pivot bearing 22 was previously located and an upper pivot bearing 8 of link 5 moves to a position in alignment with the previous position of pivot bearing 19. This action causes rotation of the drive arm 7 in a clockwise direction which causes rotation of the sprocket drive shaft 10 through the overrunning clutch 9. At the same time, the pivot bearing 37 on the front end of link 36 is moved to a position designated numeral 37a in FIG. 10. The pivot bearing 39 on the rear end of link 36 moves to a position designated by numeral 39a in FIG. 10 and rotates the control arm 38 to a position shown in dotted line form and designated by numeral 38a in FIG. 10. Pivot bearing 41 for the aft end of link 15 is in line with pivot bearing 39 and similarly moves to a position represented by numeral 39a in FIG. 10. Pivot bearing 43 on a front portion of link 15 is displaced to a location designated by numeral 43a. This results in rotation of the drive arm 33 in a counterclockwise direction which slips over the sprocket drive shaft 10 by means of overrunning clutch 18. The pivot bearing 19 for the upper end of link 20 which is attached to the other end of drive arm 33 is then displaced to a position in alignment with the previous position of pivot bearing 8. The lower pivot bearing 22 for link 20 is displaced upward to a position in alignment with the previous position of pivot bearing 35. Pedal arm 21 is thus raised to its uppermost position in line with the corresponding uppermost position of pedal arm 26.

When the operator then shifts his weight to the other pedal 23, the rotational displacement of the aforementioned linkage is reversed. This causes the drive arm 33 to rotate clockwise which, in turn, rotates the sprocket drive shaft 10 via the overrunning clutch 9. The drive arm 7 then rotates counterclockwise and slips over the clockwise rotation of the sprocket drive shaft 10 via overrunning clutch 9. The operator's legs alternately move up and down as shown in the superimposed outlines of FIG. 10 in propelling the vehicle.

The arrangement described with respect to FIGS. 7, 8, 10 and 11 in terms of the second embodiment of the present invention has a number of advantages over that of the prior art. Because the pedals 23, 28 are never on "dead center" as in the case of a conventional bicycle or tricycle, drive system efficiency is substantially increased. In addition, the pedals may be reversed at any elevation between their highest and lowest positions with greater leverage available in the middle portion of a stroke for producing increased power. The incorporation of long pedal arms 21, 26 pivoting from the rear portion of the bicycle frame 3 provides for a large substantially vertical arcuate path for the pedals 23, 28 to better utilize the operator's foot pressure. The geometry of the links 5, 20 between the pedal arms 21, 26 and the pivot arms 7, 33 provide increased torque efficiency when compared to pedals mounted on the ends of arms that oscillate about the sprocket drive shaft. The incorporation of two overrunning clutches 9 and 18 in the drive system permits coasting and therefore eliminates the need for a rear wheel hub incorporating a conventional bearing and clutch combination in providing a coasting capability.

Figure 9:
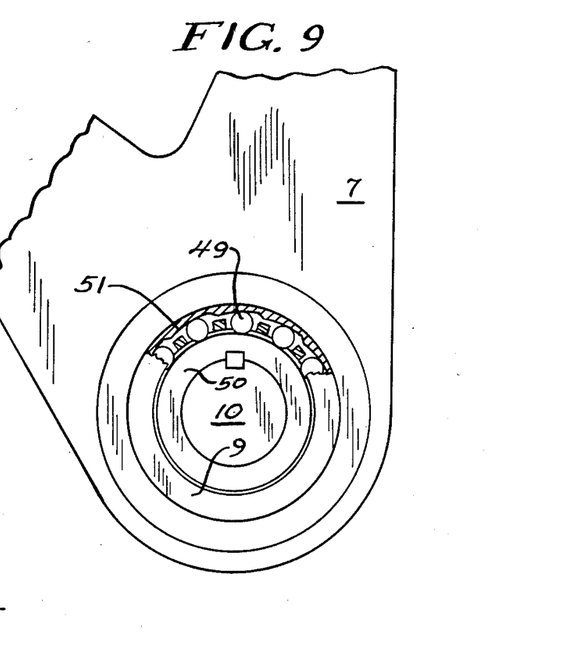
FIG. 9 is a partial sectional view of a drive arm in combination with an overrunning clutch coupled to a sprocket drive shaft for use in the reciprocating drive system of FIG. 7.
Figure 10:
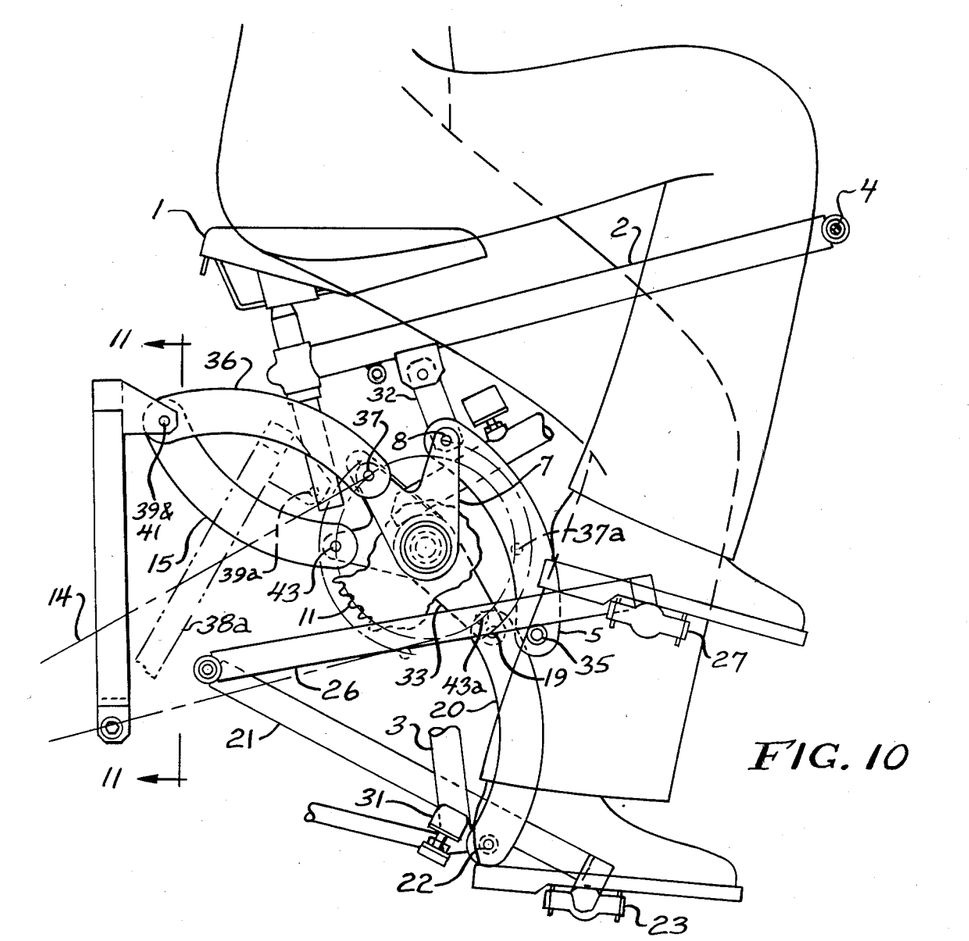
FIG. 10 is a partial side elevational view of a reciprocating drive system adapted for use in a bicycle as shown in FIG. 7 illustrating the pedals thereof in different positions during operation by a person positioned on the bicycle.

Referring to FIG. 9, there is shown a partially cut away sectional view of the hub of a drive arm 7 which includes an overrunning clutch 9 positioned upon the sprocket drive shaft 10 for use in the present invention. A plurality of rollers 49 are positioned between an inner race 50 and the curved ramps of an outer race 51 and become wedged therebetween when the hub is rotated in a clockwise direction. This wedging action imparts rotation to the inner race 50 which is keyed to the sprocket drive shaft 10. Counterclockwise rotation of the hub of the drive arm 7 disengages the rollers 49 from between the inner and outer races 50, 51 and permits the drive arm 7 to rotate freely in a pair of bearings (not shown) positioned on respective sides of the overrunning clutch 9. Although an overrunning clutch having a plurality of rollers in combination with a respective curved ramp is shown in FIG. 9, many different types of overrunning clutches including a ratchet-type of overrunning clutch could be used equally as well. The overrunning clutch shown in FIG. 9 is intended as only an example of one type of overrunning clutch which could be used in the present invention.

Referring to FIGS. 12 and 13, there is shown another arrangement in accordance with the second embodiment of the present invention. This arrangement is similar to that utilized with regard to the variation of the first embodiment described above and shown in FIGS. 5 and 6. This approach utilizes a simpler linkage arrangement than that shown in FIGS. 7, 8, 10 and 11 as described below.

In FIGS. 12 and 13, a seat arm 2 is rigidly mounted to the frame 3 by means of a pivot bearing 4 and a tie bar 32. A pivot bearing 60 is positioned on a first end of link 61 and is coupled to the pedal arm 26 which pivots about pivot bearing 28 attached to the frame 3. A pivot bearing 62 is positioned on a second end of link 61 and is attached to the end of a crank arm 55 which, in turn, is coupled to one end of a sprocket drive shaft 10. One end of a crank arm 56 is attached to the other end of the sprocket drive shaft 10, with the other end of crank arm 56 coupled to a pivot bearing 63 on link 64. A pivot bearing 65 on one end of link 64 couples the pedal arm 21 thereto.

The figures show the crank arm 55 in the "on center" position as described previously with respect to FIGS. 5 and 6. After the reciprocating vehicle drive system is moved beyond the "on center" position, the weight of the operator on the pedal 27 will rotate the sprocket drive shaft 10 and the sprocket 11 in propelling the vehicle forward. The rotation of the crank arm 56 raises link 64 which lifts the pedal arm 21 so that it is displayed to its uppermost position so as to coincide with the position shown for pedal arm 26 in FIG. 12. The momentum of the drive wheel (not shown in the figures) carries the two crank arms 55 and 56 through an "on center" position and permits the operator to alternately transfer his or her weight from one pedal to the other in alternately displacing the pedals downward so as to rotate the opposed crank arms which, in turn, rotates the forward drive sprocket 11 in propelling the vehicle forward.

The present invention is capable of being easily converted from one embodiment to the other. In changing from the embodiment shown in FIG. 1 wherein both the seat and pedals are displaced in a generally vertical, reciprocating manner to the embodiment shown in FIG. 7 wherein only the pedals move up and down, link 5 is disconneoted from pivot bearing 6 and is reattached to pivot bearing 35. In addition, link 15 is decoupled from pivot bearings 16 and 17 and is attached to pivot bearings 41 and 43. The coupling of link 20 remains unchanged, however, tie member 25 is disconnected from pedal arms 21 and 26 and tie bar 32 is coupled between the seat arm 2 and the frame 3. Finally, the control arm 38 and link 36 may remain attached to the frame 3 at pivot bearing 40 and to the drive arm 7 at pivot bearing 37 for both drive modes. The embodiment wherein the seat and pedals both undergo reciprocal displacement does not require these parts and they therefore are not shown in FIGS. 1 through 4 as they do not affect the drive system other than increasing the weight of the vehicle.

There has thus been shown an operator powered reciprocating drive system for rotationally displacing a drive wheel. The drive system may be easily converted from a first embodiment to a second embodiment and vice versa. In one embodiment, both the seat and the pedals are alternately displaced up and down in a generally vertical direction and in a reciprocating manner in response to application of the operator's weight to either the seat or the pedals. The operator experiences a "galloping horse" effect as his or her weight is alternately applied to the seat and the pedals in propelling a vehicle forward. In a second embodiment, the seat is fixedly mounted to the vehicle frame and the pedals are alternately displaced downward in a reciprocating manner by the weight of the operator applied thereto in propelling the vehicle. Various improved linkage arrangements for coupling the pedals and the seat to a forward drive sprocket are disclosed. The present invention is particularly adapted for use in a bicycle although it could be used equally as well in virtually any velocipede. In addition, the drive system of the present invention could as easily be adapted for use in a stationary exerciser having a single wheel or for propelling a boat. Finally, while the present invention is shown as being easily convertible from one embodiment to another, either of these embodiments could be designed so as not to be convertible in order to simplify the design, reduce the cost, and lessen the weight of the vehicle.

While particular embodiments of the present invention have been shown and described, it will be obvious to those skilled in the art that changes and modifications may be made without departing from the invention in its broader aspects. For example, pulleys and belt or gearing assemblies could be substituted for the sprocket and chain arrangements disclosed herein for use as an alternate power transmission arrangement in practicing the principles of the present invention. There could also be many equivalent bearing clutch combinations which could be substituted for and would work equally as well as the overrunning clutch assembly described herein. It should further be noted that conventional means for changing sprocket gear ratios of the drive wheel are compatible with and could be used in the operator powered reciprocating drive system described herein. Finally, although braking means for the vehicle are not shown, conventional caliper type braking means, or the equivalent, could be used on any one or more of the wheels of the vehicle for use in combination with the present invention. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

I claim:

1. An operator powered reciprocating drive system for rotationally displacing a drive wheel, said drive system convertible between first and second modes of operation, said drive system comprising:

a frame;
a seat pivotally coupled to said frame;
first and second coupled support means pivotally mounted to said frame;
drive means rotationally mounted to said frame and coupled to said drive wheel;
first linkage coupled to said seat and to said drive means for rotating said drive means in a first direction when the weight of the operator is applied to said seat in a first mode of operation;
second linkage coupled to said first and second support means and to said drive means for continuing the rotation of said drive means in said first direction when the weight of the operator is transferred from said seat to said first and second support means in rotationally displacing the drive wheel in response to the alternate, reciprocating generally linear displacement of said seat and said first and second support means in a first mode of operation;
first coupling means mounted to said frame and to said seat for securely coupling said seat to said frame wherein said seat is no longer free to pivot with respect to said frame in a second mode of operation;
a control arm pivotally coupled to said frame;
means for disconnecting said first linkage from said seat and coupling said first linkage to said control arm in a second mode of operation;
means for decoupling said first and second support means;
means for decoupling said second linkage from said second support means; and
third linkage coupled to said second support means and to said drive means wherein said drive means and the drive wheel coupled thereto are rotated in a first direction in response to application of the operator's weight to and the resulting generally linear, reciprocating displacement of said first and second decoupled support means in an alternating manner in a second mode of operation.

2. A drive system in accordance with claim 1 wherein said first and second support means respectively include right and left pedals.

3. A drive system in accordance with claim 2 wherein said first and second support means further include right and left pivot bars each pivotally coupled at a first end thereof to said right and left pedals, respectively, and pivotally coupled at respective second ends thereof to an aft portion of said frame.

4. A drive system in accordance with claim 1 wherein said drive means comprises a drive sprocket and said drive wheel includes a driven sprocket mounted thereto.

5. A drive system in accordance with claim 4 further comprising an endless, flexible chain coupling said drive sprocket and said driven sprocket.

6. A drive system in accordance with claim 1 further comprising a pivot arm, wherein said seat is mounted to said pivot arm and said pivot arm is pivotally coupled to said frame and to said drive means by means of said first linkage in the first mode of operation.

7. A drive system in accordance with claim 6 wherein said first linkage is comprised of paired links pivotally coupled to said drive means and to said pivot arm.

8. A drive system in accordance with claim 1 wherein said second linkage is comprised of a single link pivotally coupled to said first and second support means and to said drive means in the first mode of operation.

9. A drive system in accordance with claim 1 further comprising second coupling means coupling said first and second support means for ensuring synchronous displacement thereof in the first mode of operation.

10. A drive system in accordance with claim 1 further comprising overrunning clutch means coupling said first linkage to said drive means in the first and second modes of operation.

11. A drive system in accordance with claim 1 further comprising first and second stop means coupled to said frame for respectively limiting the downward displacement of said seat in the first mode of operation and said first and second support means in the first and second modes of operation.

12. An operator powered reciprocating drive system for rotationally displacing a drive wheel, said drive system comprising:

a frame to which said drive wheel is mounted;
a seat pivotally coupled to said frame;
pedal means pivotally mounted to an aft portion of said frame;
drive means including a shaft rotationally mounted to said frame and a drive sprocket rigidly coupled to said shaft so as to rotate therewith, said drive means further including first and second drive levers coupled to said shaft for rotation therewith, wherein said drive sprocket is further coupled to said drive wheel;
a first link coupled to said seat and to the first drive lever of said drive means for rotating said drive sprocket in a first direction when the weight of the operator is applied to said seat; and
a second link coupled to said pedal means and to the second lever of said drive means for continuing the rotation of said drive sprocket in said first direction when the weight of the operator is transferred from said seat to said pedal means in rotationally displacing the drive wheel in response to the alternate, reciprocating, generally linear displacement of said seat and said pedal means.

13. A drive system in accordance with claim 12 wherein said pedal means comprises a pair of coupled pedals pivotally mounted to said frame.

14. A drive system in accordance with claim 12 wherein said drive system further comprises a driven sprocket mounted to the drive wheel and an endless, flexible chain coupling said drive and driven sprockets for rotationally displacing the drive wheel.

15. A drive system in accordance with claim 14 wherein said first link includes a pair of overrunning clutches coupled to said drive sprocket.

16. A drive system in accordance with claim 15 further comprising first and second cushioned stop means mounted to said frame for respectively limiting the downward displacement of said seat and said pedal means.

17. An operator powered reciprocating drive system for rotationally displacing a drive wheel, said drive system comprising:

a frame to which said drive wheel is rotationally mounted;

first and second pedals pivotally mounted to an aft portion of said frame by first and second pivot arms, respectively;

drive means including a single shaft rotationally mounted to said frame and a drive sprocket rigidly coupled to said shaft so as to rotate therewith, said drive means further including first and second drive levers coupled to said single shaft so as to rotate therewith, wherein said drive sprocket is further coupled to said drive wheel;

first and second overrunning clutches mounted to said single shaft at respective ends thereof;

first linkage coupled to said first pivot arm and to said first drive lever by means of said first overrunning clutch for rotating said drive sprocket in a first direction in response to the generally linear, downward displacement of said first pedal by the operator;

second linkage coupled to said second pivot arm and to said second drive lever by means of said second overrunning clutch for continuing the rotation of said drive sprocket in said first direction in response to the generally linear, downward displacement of said second pedal by the operator wherein the rotation of said drive sprocket in response to the downward displacement of one of said pedals rotates a respective linkage causing the upward displacement of the other pedal, whereby said drive wheel is rotationally displaced by the alternate, generally linear, reciprocating displacement of said first and second pedals; and first and second cushioned stop means mounted to said frame for limiting the downward displacement of said first and second pedals, respectively.

18. A drive system in accordance with claim 17 wherein said drive system further comprises a driven sprocket mounted to said drive wheel and a flexible, endless chain coupling said drive and driven sprockets.

19. A drive system in accordance with claim 17 further comprising first and second pivot arms respectively coupling said first and second pedals to an aft portion of said frame.

* * * * *